July 13, 1926.
F. N. SPELLER
1,592,647
METHOD AND MEANS FOR DEACTIVATION OF WATER
Filed June 12, 1920
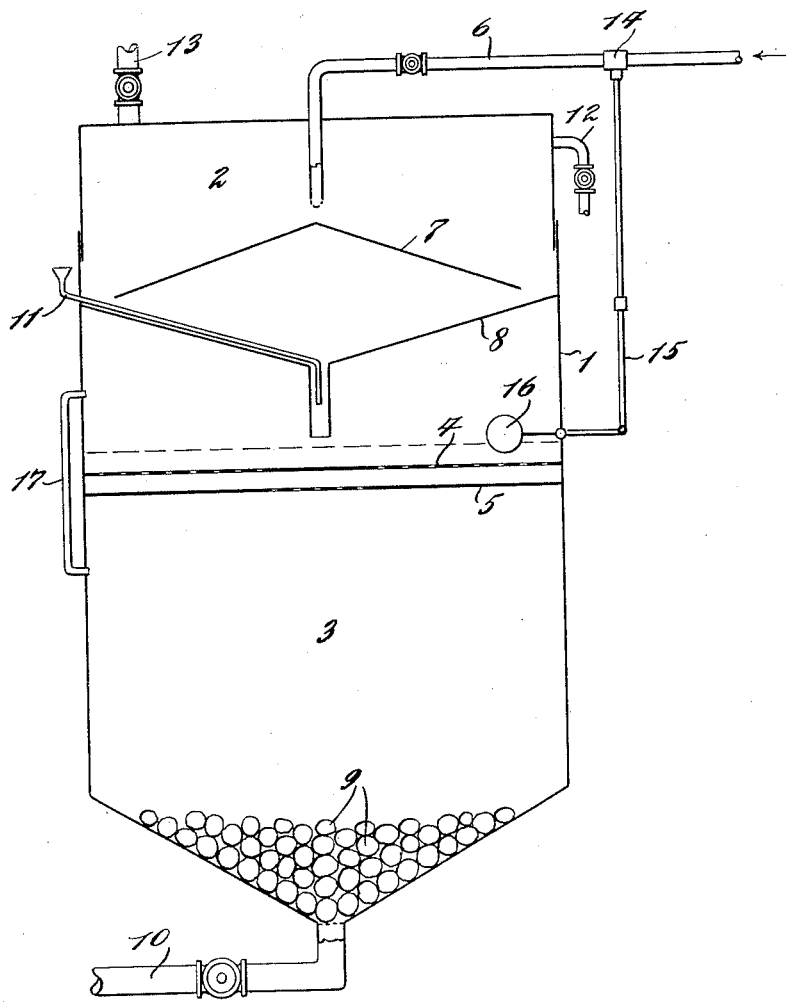
Frank N. Speller INVENTOR.
BY
Lewis J. Doolittle ATTORNEY.

Patented July 13, 1926.

1,592,647

UNITED STATES PATENT OFFICE.

FRANK N. SPELLER, OF PITTSBURGH, PENNSYLVANIA.

METHOD AND MEANS FOR DEACTIVATION OF WATER.

Application filed June 12, 1920. Serial No. 388,411.

This invention relates to a method and means for the deactivation of water to render it non-corrosive.

In order to more clearly point out the particular and novel features of this invention attention may be called briefly to the following facts, some of which have been determined by this applicant in the course of his work on inventions developed as a result of many experiments and tests.

The corrosive action of water on metal is principally due to the dissolved oxygen in the water. Inventions relating to this subject may be divided into two classes; (1) mechanical deaeration by heating the water to the boiling point, which drives off a large part of the dissolved oxygen, (2) chemical deactivation by bringing the water in contact with a reagent which takes up or combines with the dissolved oxygen.

In theory, and to a certain extent in practice, either of these methods will produce the intended results. For instance, the first or mechanical method, provided the water is kept constantly at the boiling point, may reduce the amount of oxygen to 0.3 c. c. per litre, but this involves waste of fuel or expensive condensing and heat exchange apparatus to prevent loss, and the resulting water is not low enough in oxygen content for all uses. The second or chemical method may be prohibitive in cost for the removal of substantially all of the dissolved free oxygen where large quantities of water are involved, as in power plant work, etc. The element of time required must be taken into consideration, as in many cases where it is necessary to supply large quantities of water the size of the tanks where the water is brought into contact with the chemical reagent would be of very large size and capacity in order to permit the water to remain in contact with the reagent a sufficient length of time to remove the dissolved oxygen to the required extent. This not only presents the objection of space required for the apparatus but also the cost of the large amount of reagent required and, in some cases, the removal, by filtration or other means, of the products of the chemical reaction.

The object of this invention is to provide a simple and compact device and efficient method for accomplishing the removal of substantially all of the corrosive agents from the water, which will be economical in cost, both for installation and operation, and which will be rapid in operation, thus reducing the size of the apparatus to the minimum.

To accomplish this object I utilize the effective features of both the mechanical deaeration and chemical deactivation combined so as to avoid the practical objections to each, as above pointed out, and to utilize the most efficient features thereof.

Briefly stated, my method and apparatus is arranged and designed to remove or drive off about 90% of the dissolved oxygen from the water by mechanical means and then to remove substantially all of the remaining or residual oxygen by chemical means. For the removal of the last ½ c. c. per litre of dissolved oxygen, which it is so difficult to accomplish by mechanical means, chemical treatment is economical and rapid. All of these features will be described more fully hereinafter in connection with the description of the device or apparatus shown in the accompanying drawings as an illustration of one of the operative embodiments of my invention.

The drawing is a diagrammatic illustration of one arrangement of the apparatus which I have used for the purpose stated.

A suitable receptacle or tank is shown at 1 and is divided into upper and lower compartments 2 and 3 by a partition composed of two perforated walls 4 and 5.

Hot water, heated by any suitable means to a temperature 10 or 20 deg. F. below the boiling point, is introduced into the upper compartment 2 by means of the pipe 6, which may be provided with a valve 14 controlled and connected by means of link 15 to a float 16 in the upper compartment 2, and discharges the water in the form of a spray, causing it to flow over the inclined baffle members 7 and 8, thus effecting the preliminary or partial deaeration by the mechanical agitation of the water, which then passes through the perforated partition walls 4—5 to the lower compartment 3, where it is brought into contact with a chemical deactivating substance, and passes out through the outlet pipe 10.

A water gage 17 may be provided to indicate the level of the water in the compartments.

The lower compartment 3 may be partly or entirely filled with a solid reagent, such as briquettes consisting essentially of ferrous hydrate, as indicated at 9, or steel sheets of suitable form, which will take up the free or dissolved oxygen (remaining) in an insoluble and inert combination, thus removing it from solution and rendering the water inactive towards iron.

A pipe 11 leads into the upper compartment 2 to the central portion of the lower baffle member 8, by means of which a small amount of a deactivating solution, such as ferrous sulphate, which is inexpensive, may be introduced and caused to be mixed in the proper proportion with the water as it leaves the baffle member 8 and passes through the perforated partition walls 4—5, which are preferably located just below the normal water level, before it enters the lower compartment 3 and is brought into contact with the briquettes 9. The result of this is to accomplished a partial removal of the residual free oxygen in a few seconds, leaving only a small amount to be finally removed by the briquettes, which are thus kept in a more effective and efficient condition for rapid action for a greater length of time and avoiding frequent renewal.

The ferrous sulphate solution may be fed into the apparatus by any device for regulation of the feed in the desired proportion to the amount of water flowing.

About 90% of the dissolved oxygen is driven off from the water in the upper compartment 2 as it leaves the supply pipe 6 in a spray and passes over the baffles 7 and 8. I have found that the water, as stated, need not be heated to the boiling point but may be 15 or 20 deg. F. below and by creating a partial vacuum, by means of a suitable vacuum pump, connected by means of the pipe indicated at 12, this temperature may be still further reduced.

A vent pipe 13, provided with a suitable valve for closing the same, may be provided for use in cases where it is not desired to use a vacuum.

The temperature to which it is necessary to heat the water supply is an important consideration from the standpoint not only of the cost of the necessary heating apparatus and its operation, but also as affecting the efficiency of the device in removing the oxygen. It will be seen that with this arrangement a relatively wide range of temperature of the water supplied is possible without affecting the efficiency in effecting the final deactivation of the water delivered from the device, on account of the fact that the varying percentage of residual oxygen remaining after the mechanical deaeration in the upper compartment 2 is automatically taken care of and removed by the chemical deactivation which takes place as it passes through the perforated partition walls 4—5 and in the lower compartment 3.

It will be understood that the invention is not limited to the particular means shown and described, either as to the arrangement for effecting the mechanical deaeration or for the chemical deactivation, as it will be obvious that various means may be employed to accomplish the desired result, more or less effectively. For example, the air may be removed at the same time the water is being heated, as in the well known open type vented heater, and various other modifications and arrangements may be employed without departing from the spirit and scope of the invention as defined in the appended claims.

What I claim is:—

1. A device of the class described, comprising a receptacle divided into upper and lower compartments by a perforated partition, an inlet supply pipe provided with means for delivering the water into said upper compartment in a spray, a series of baffle members positioned in said upper compartment below said spray inlet and co-operating therewith to cause a mechanical agitation of the water, a pipe leading to the last of said baffle members adjacent the outlet therefrom adapted to supply a deactivating solution to the water at this point, and chemical deactivating means in said lower compartment adapted to effect a final deactivation of the water.

2. The method of treating boiler feed water which consists in removing the greater portion of the air contained in the water and then passing the water over an oxidizable material.

3. The method of treating boiler feed water which consists in heating the water to remove the greater portion of the air contained in the water and then passing the water over an oxidizable material.

4. The method of treating water which consists in heating the water to slightly below the boiling point to remove the major portion of the oxidizing gases contained in the water, and then passing the heated water over an oxidizable material to remove substantially all the remaining oxidizing gases.

Signed at Pittsburgh, in the county of Allegheny and State of Pennsylvania, this 22d day of May A. D. 1920.

FRANK N. SPELLER.